(12) United States Patent
Foeller et al.

(10) Patent No.: US 7,585,247 B2
(45) Date of Patent: Sep. 8, 2009

(54) SIX-SPEED AUTOMATIC TRANSMISSION WITH THREE PLANETARY GEARSETS

(75) Inventors: Mark R. Foeller, Grass Lake, MI (US); Steven R. Fliearman, Howell, MI (US); Dustin B. Skavang, Highland, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 409 days.

(21) Appl. No.: 11/530,569

(22) Filed: Sep. 11, 2006

(65) Prior Publication Data

US 2008/0064557 A1    Mar. 13, 2008

(51) Int. Cl.
F16H 3/62 (2006.01)
F16H 3/44 (2006.01)

(52) U.S. Cl. .................. 475/280; 475/276

(58) Field of Classification Search ......... 475/280–287, 475/311–312, 317, 318, 323, 324, 275, 276
See application file for complete search history.

(56) References Cited

U.S. PATENT DOCUMENTS

| | | | |
|---|---|---|---|
| 4,228,697 A | * | 10/1980 | Miller .................. 475/276 |
| 4,748,869 A | * | 6/1988 | Ohtsuka .................. 475/54 |
| 5,533,945 A | | 7/1996 | Martin et al. |
| 5,536,220 A | | 7/1996 | Martin |
| 6,656,078 B1 | | 12/2003 | Raghavan et al. |
| 6,679,803 B1 | | 1/2004 | Raghavan et al. |
| 7,192,378 B2 | * | 3/2007 | Raghavan et al. .......... 475/276 |

FOREIGN PATENT DOCUMENTS

EP    1 236 930 A2    9/2002

* cited by examiner

Primary Examiner—Tisha D Lewis

(57) ABSTRACT

A six-speed automatic transmission for a vehicle includes a transmission housing, an input member, an output member, three planetary gearsets for changing a ratio of torque between the input member and the output member, clutch assemblies to selectively couple the input member to predetermined members of the planetary gearsets, and brake assemblies to selectively couple predetermined members of the planetary gearsets to the transmission housing. The transmission achieves an improved gear ratio spacing and, correlatively, enhanced vehicle drivability, performance, and fuel economy, by respectively permanently coupling the planetary carrier of the first gearset with the sun gear of the second gearset, the annulus gears of the first and third gearsets with the planetary carrier of the second gearset, and the output member with both the annulus gear of the second gearset and the planetary carrier of the third gearset.

4 Claims, 1 Drawing Sheet

| GEAR | | GEAR RATIO | C1 | C2 | C3 | C4 | C5 | C6 | FW |
|---|---|---|---|---|---|---|---|---|---|
| 1 | | 3.23 | X | | | | | X | X |
| 2 | | 1.84 | X | | | | X | | |
| 3 | | 1.41 | X | | | X | | | |
| 4 | | 1.00 | X | X | | | | | |
| 5 | | 0.82 | | X | | X | | | |
| 6 | | 0.63 | | X | | | X | | |
| REV | | -4.44 | | | X | | | X | |
| Spread | | 5.17 | | | | | | | |
| Planetary Ratio | R1 | 1.67 | | | | | | | |
| | R2 | 1.67 | | | | | | | |
| | R3 | 2.23 | | | | | | | |

SIX-SPEED AUTOMATIC TRANSMISSION WITH THREE PLANETARY GEARSETS

FIELD OF THE INVENTION

The invention relates generally to an automatic transmission for a motor vehicle, such as an automobile, incorporating three planetary gear sets.

BACKGROUND OF THE INVENTION

A conventional automatic transmission includes a hydrodynamic torque converter to transfer engine torque from an engine crankshaft to a rotatable input member of the transmission through fluid-flow forces. The transmission also includes frictional units, typically referred to as clutches, which couple the rotatable input member to one or more members of the planetary gearsets. Other frictional units, typically referred to as brakes, hold one or more members of the planetary gearsets stationary during the flow of power. Such transmissions also typically provide for one or more planetary gearsets in order to provide various ratios of torque and to ensure that the available torque and the respective tractive power demand are matched to each other.

One disadvantage of such known automatic transmissions is that it is more difficult with good planetary gearset design to provide an overdrive ratio of 0.75 or greater while yet achieving a gear ratio spacing in the transmission's lower gears (numerically higher gear ratios) that enhances vehicle drivability, performance, and fuel economy.

SUMMARY OF THE INVENTION

Under the invention, an automatic transmission for a vehicle includes a transmission housing, an input member, an output member, three planetary gearsets for changing a ratio of torque between the input member and the output member, a plurality of clutch assemblies to selectively couple the input member to predetermined members of the planetary gearsets, and a plurality of brake assemblies to selectively couple predetermined members of the planetary gearsets to the transmission housing. In accordance with an aspect of the invention, the planetary carrier of the first planetary gearset is permanently coupled for rotation with the sun gear of the second planetary gearset, the annulus gears of the first and third planetary gearsets are each permanently coupled for rotation with the planetary carrier of the second planetary gearset, and the output member is permanently coupled for rotation with each of the annulus gear of the second planetary gearset and the planetary carrier of the third planetary gearset.

In accordance with another aspect of the invention, in a preferred embodiment, a third clutch assembly selectively couples the input member to the sun gear of the third planetary gearset to achieve at least one underdrive gear ratio. And, in accordance with another aspect of the invention, in the preferred embodiment, a second clutch assembly selectively couples the input member to the planetary carrier of the second planetary gearset to achieve at least one overdrive gear ratio. In accordance with yet another aspect of the invention, in the preferred embodiment, a first clutch assembly selectively couples the input member to the sun gear of the first planetary gearset, and the output member rotates in a direction opposite to that of the input member, whereby a reverse gear of the transmission is achieved.

In a six-speed embodiment of the automatic transmission of the invention, the transmission employs an arrangement of interconnected planetary gearsets to achieve an improved ratio spacing of small to medium magnitude, especially between second and third gears. The six-speed transmission of the invention further advantageously provides an improved overdrive ratio spacing between fifth and sixth gears.

Other objects, features, and advantages of the present invention will be readily appreciated upon a review of the subsequent description of the preferred embodiment and the appended claims, taken in conjunction with the accompanying Drawings.

DETAILED DESCRIPTION OF THE INVENTION

Figures 1, 2:
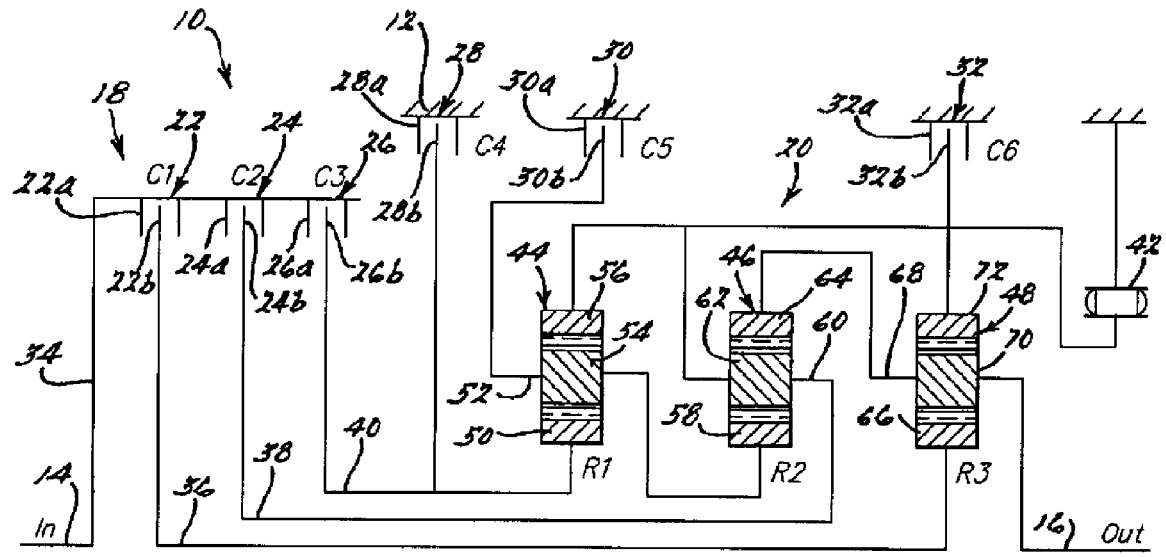
FIG. 1 is a cross-sectional schematic view of an exemplary automatic transmission in accordance with the invention.
FIG. 2 is a chart of gears, gear ratio, and clutches and brakes engaged for the six-speed automatic transmission of FIG. 1 when used as a six-speed overdrive transmission.

Referring to FIG. 1, a cross-sectional schematic view of an exemplary six-speed automatic transmission 10 in accordance with the invention includes a transmission housing 12 for enclosing a torque converter assembly (not shown), an input member 14, an output member 16, a multi-clutch and brake assembly 18, and a gear assembly 20. The transmission housing 12 is stationary relative to the rotatable input member 14, output member 16, and gear assembly 20. Power is transmitted from a rotating crankshaft (not shown) of an engine (not shown) to the torque converter assembly, in turn, to the rotatable input member 14.

The multi-clutch and brake assembly 18 allows predetermined gears within the gear assembly 20 to be selectively engaged and disengaged from either the input member 14 or the transmission housing 12. Near the input side of the transmission 10, the multi-clutch and brake assembly 18 includes an underdrive clutch assembly 22 (applied in first, second, third and fourth gears), an overdrive clutch assembly 24 (applied in fourth, fifth, and sixth gears), and a reverse clutch assembly 26 (applied in reverse gear). Near the output side of the transmission 10, the multi-clutch and brake assembly 18 includes a three/five brake assembly 28 (applied in third and fifth gears), a two/six brake assembly 30 (applied in second and sixth gears), and a low/reverse brake assembly 32 (applied in first and reverse gears) and. The multi-clutch and brake assembly 18 also includes an input retainer 34 splined to the input member 14.

The underdrive clutch assembly 22 includes a plurality of axially-spaced annular plates 22a and a plurality of axially spaced annular discs 22b which are alternated between the plates 22a. When the underdrive clutch assembly 22 is not applied, plates 22a and discs 22b are free to move or rotate relative to each other. The plates 22a are mounted to the input retainer 34 and the discs 22b are mounted to an underdrive hub 36. The underdrive hub 36 is operatively connected to the gear assembly 20.

The overdrive clutch assembly 24 includes a plurality of axially-spaced annular plates 24a and a plurality of axially spaced annular discs 24b. The plates 24a are mounted to the input retainer 34 and the discs 24b are mounted to an overdrive hub 38 operatively connected to the gear assembly 20.

The reverse clutch assembly 26 includes a plurality of axially-spaced annular plates 26a and a plurality of axially spaced annular discs 26b. The plates 26a are mounted to the input retainer 34 and the discs 26b are mounted to a reverse hub 40 operatively connected to the gear assembly 20. It should be appreciated that the clutch assemblies 22, 24, and 26 are applied by fluid actuating devices (not shown).

The three/five brake assembly 28 includes a plurality of axially spaced annular plates 28a and a plurality of axially spaced annular discs 28b. The plates 28a are mounted to the transmission housing 12 and the discs 28b are mounted to the clutch hub 40.

The two/six brake assembly 30 includes a plurality of axially-spaced annular plates 30a and a plurality of axially spaced annular discs 30b. The plates 30a are mounted to the transmission housing 12 and the discs 30b are mounted to the gear assembly 20 as described below.

The low/reverse brake assembly 32 includes a plurality of axially-spaced annular plates 32a and a plurality of axially-spaced annular discs 32b. The plates 32a are mounted to the transmission housing 12 and the discs 32b are mounted to the gear assembly 20 as described below. It will be appreciated that the brake assemblies 28, 30 and 32 are applied by fluid actuating devices (not shown).

A freewheel clutch 42 rotationally coupled to the discs 32b ensures that the discs 32b rotate in only one direction relative to the plates 32a.

The gear assembly 20 includes a front or first planetary gearset 44, an axially-spaced intermediate or second planetary gearset 46, and an axially-spaced rear or third planetary gearset 48. The first planetary gearset 44 includes a first sun gear 50 coupled to the reverse hub 40. The first planetary gearset 44 also includes a first planetary carrier 52 supporting a plurality of circumferentially-spaced first planet gears 54 in engagement with the first sun gear 50. The first planetary carrier 52 is rotationally coupled to the discs 30b of the two/six brake assembly 30. The first planetary gearset 44 further includes a first annulus gear 56 disposed about the first planetary carrier 52 which engages the first planet gears 54. The first annulus gear 56 is rotationally coupled to the discs 32b of the low/reverse brake assembly 32. By way of example only, in the exemplary embodiment, the ratio of the number of teeth on the first annulus gear 56 to the number of teeth on the first sun gear 50 is 1.67.

The second planetary gearset 46 includes a second sun gear 58 rotationally coupled to the first planetary carrier 52 of the first planetary gear set 44. The second planetary gearset 46 also includes a second planetary carrier 60 supporting a plurality of circumferentially-spaced second planet gears 62 for engagement with the second sun gear 58. The second planetary carrier 60 is rotationally coupled to both the overdrive hub 38 and the discs 32b of the low/reverse brake assembly 32, and the first and second annulus gears 56,72 of the first and third planetary gearsets 44,48. The second planetary gearset 46 further includes a second annulus gear 64 disposed about the second planetary carrier 60 and engaging the second planet gears 62. The second annulus gear 64 is connected to the third planetary gearset 48 as described below. By way of example only, in the exemplary embodiment, the ratio of the number of teeth on the second annulus gear 64 to the number of teeth on the second sun gear 58 is 1.67.

The third planetary gearset 48 includes a third sun gear 66 rotationally coupled to the underdrive hub 36. The third planetary gearset 48 also includes a third planetary carrier 68 supporting a plurality of circumstantially-spaced planet gears 70 for engagement with the third sun gear 66. The third planetary carrier 68 is rotationally coupled to both the second annulus gear 64 and the output member 16 of the transmission 10. The third planetary gearset 48 further includes a third annulus gear 72 disposed about the third planetary carrier 68 and engaging the third planet gears 70. By way of example only, in the exemplary embodiment, the ratio of the number of teeth on the third annulus gear 72 to the third sun gear 66 is 2.23.

Referring again to FIG. 1, in operation, upon application of the underdrive clutch assembly 22, frictional forces generated between the plates 22a and discs 22b cause the input retainer 34 to drive the underdrive hub 36 and, with it, the third sun gear 66 of the third planetary gearset 48. Upon application of the overdrive clutch assembly 24, frictional forces generated between the plates 24a and discs 24b cause the input retainer 34 to drive the overdrive hub 38 and, with it, the second planetary carrier 60 and the supported second planets 62 of the second planetary gearset 46, as well as the first and third annulus gears 56,72 of the first and third planetary gearsets 44,48. And, upon application of the reverse clutch assembly 26, frictional forces generated between the plates 26a and discs 26b cause the input retainer 34 to drive the reverse hub 40 and the first sun gear 50 of the first planetary gearset 44.

Similarly, upon application of the three/five brake assembly 28, frictional forces generated between the plates 28a and discs 28b cause the first sun gear 50 of the first planetary gearset 44 to be grounded to the transmission housing 12. Upon application of the two/six brake assembly 30, frictional forces generated between the plates 30a and discs 30b cause both the first planetary carrier 52 of the first planetary gearset 44 and the second sun gear 58 of the second planetary gearset 46 to be grounded to the transmission housing 12. And, upon application of the low/reverse brake assembly 32, frictional forces generated between the plates 30a and discs 30b of the low/reverse brake assembly 30 cause the first and third annulus gears 56,72 of the first and third planetary gearsets 44,48, as well as the second planetary carrier 60 of the second planetary gearset 46, to be grounded to the transmission housing 12.

Referring to FIGS. 1 and 2, when the transmission 10 is to be operated in "first gear," the underdrive clutch assembly 22 and low/reverse brake assembly 32 are applied, causing the third sun gear 66 to be driven by the input shaft 14 via the underdrive hub 36 while the third annulus gear 72 is held stationary (initially through application of the low/reverse clutch assembly 32 and thereafter by the freewheel clutch 42). As a result, the rotating third sun gear 66 drives the third planetary carrier 68 via the third planet gears 70. Because the output member 16 is coupled to the third planetary carrier 68, the rotation of the third planetary carrier 68 causes the output member 16 to rotate, with a reducing gear ratio of 3.23.

When the transmission 10 is to be operated in "second gear," the underdrive clutch assembly 22 and the two/six brake assembly 30 are applied, causing the third sun gear 66 to be driven by the input shaft 14 (via the underdrive hub 36) while the second sun gear 58 is held stationary (via the grounding of the rotationally-coupled first planetary carrier 52). As a result, the rotating second planetary carrier 60 drives the second annulus gear 64 via the second planet gears 62. Because the output member 16 is coupled to the second annulus gear 64 (via the rotationally-coupled third planetary carrier 68), the rotation of the second planetary carrier 60 causes the second annulus gear 64 to rotate, with a reducing gear ratio of 1.84.

When the transmission 10 is to be operated in "third gear," the underdrive clutch assembly 22 and the three/five brake assembly 28 are applied, causing the third sun gear 66 to rotate and the first sun gear 50 to be held stationary. As a result, rotation of the third sun gear 66 causes each of the third planetary carrier 68 and second annulus gear 64, as well as each of the third annulus gear 72, the second planetary carrier 60, and the first annulus gear 56 to rotate, whereupon the first planetary carrier 52 further rotates with the second sun gear 58. As a result, the output member 16 will be caused to rotate, with a reducing gear ratio of 1.41.

When the transmission 10 is to be operated in "fourth gear," the underdrive and overdrive clutch assemblies 22, 24 are applied, causing the third sun gear 66 and the second planetary carrier 60 (and, thus, the third annulus gear 72) to rotate at the same speed. As a result, the third planetary carrier 68 and the output member 16 are caused to rotate at the same speed, thereby providing a gear ratio of 1.00.

When the transmission 10 is to be operated in "fifth gear," the overdrive clutch assembly 24 and the three/five brake assembly 28 are applied, causing each of the second planetary carrier 60, the first annulus gear 56, and the third annulus gear 72 to rotate, and causing the first sun gear 50 to be held stationary. As a result, the first planetary carrier 52 rotates with the rotationally-coupled second sun gear 58, thereby causing the second annulus gear 64, third planetary carrier 68, and the output member 16 to rotate together faster than in fourth gear, and, in the exemplary embodiment, producing an overdrive gear ratio of 0.82.

When the transmission 10 is to be operated in "sixth gear," the overdrive clutch assembly 24 and the two/six brake assembly 30 are applied, causing the second planetary carrier 60 to rotate, and causing the first planetary carrier 52 and the second sun gear 58 to be held stationary. As a result, the second annulus gear 64, the third planetary carrier 68, and the output member 16 rotate together faster than in fifth gear, to produce a further overdrive gear ratio of 0.63.

When the transmission 10 is desired to operate in "reverse gear," the reverse clutch assembly 26 and low/reverse brake assembly 32 are applied, causing the first sun gear 50 to rotate and each of the first annulus gear 56, the second planetary carrier 62, and the third annulus gear 72 to be held stationary. As a result, the first sun gear 50 causes the first planetary carrier 52 to rotate. The rotation of the first planetary carrier 52 causes the second sun gear 58 to rotate which, in turn, causes rotation of the second annulus gear 64 and the output member 16 in a direction opposite to the other gear positions. This arrangement of the gear assembly 20 produces a gear ratio of −4.44.

Accordingly, the six-speed automatic transmission 10 has a unique arrangement of the planetary gearsets 44,46,48 to advantageously achieve a 0.82 overdrive ratio in fifth gear and a 0.63 overdrive ratio in sixth gear. The unique arrangement of the planetary gearsets 46, 48 and 50 further beneficially results in ratio steps of small to medium magnitude, from first gear through sixth gear, to improve vehicle fuel efficiency and enhance vehicle drivability.

While the above description constitutes the preferred embodiment, it will be appreciated that the invention is susceptible to modification, variation and change without departing from the proper scope and fair meaning of the subjoined claims. By way of example only, while the reverse clutch 26 of the preferred embodiment 10 operates to selectively couple the input member 14 to the first sun gear 50 of the first planetary gearset 44, the invention contemplates the alternative possibility of driving the planetary carrier 52 of the first planetary gearset 44 upon application of the reverse clutch 26 (when accompanied by such other changes, for example, in gearset ratios as necessary to obtain the desired transmission performance). Similarly, while the overdrive clutch 24 of the preferred embodiment operates to selectively couple the input member 14 to the planetary carrier 60 of the second planetary gearset 44 (along with each of the permanently coupled first and third annulus gears 56,72 of the first and third planetary gearsets 44,48), the invention contemplates the alternative possibility of driving the second sun gear 58 of the second planetary gearset 52 upon application of the overdrive clutch 24 (again, when accompanied by such other changes, for example, in gearset ratios as necessary to obtain the desired transmission performance).

What is claimed is:

1. An automatic transmission for a vehicle comprising:
a transmission housing;
an input member;
an output member;
three planetary gearsets for changing a ratio of torque between the input member and the output member, each planetary gearset having a plurality of members including a sun gear, a planetary carrier supporting a plurality of planet gears engaging the sun gear, and an annulus gear engaging the plurality of planet gears;
a plurality of clutch assemblies operative to selectively couple the input member to predetermined members of the planetary gearsets; and
a plurality of brake assemblies operative to selectively couple predetermined members of the planetary gearsets to the transmission housing,
wherein the planetary carrier of the first planetary gearset is permanently coupled for rotation with the sun gear of the second planetary gearset, the annulus gears of the first and third planetary gearsets are each permanently coupled for rotation with the planetary carrier of the second planetary gearset, and the output member is permanently coupled for rotation with each of the annulus gear of the second planetary gearset and the planetary carrier of the third planetary gearset, and
wherein a first clutch assembly selectively couples the input member to the sun gear of the first planetary gearset, and the output member rotates in a direction opposite to the input member.

2. The transmission of claim 1, wherein a third clutch assembly selectively couples the input member to the sun gear of the third planetary gearset to achieve at least one underdrive gear ratio.

3. The transmission of claim 1, wherein a second clutch assembly selectively couples the input member to the planetary carrier of the second planetary gearset to achieve at least one overdrive gear ratio.

4. The transmission of claim 3, wherein a third clutch assembly selectively couples the input member to the sun gear of the third planetary gearset to achieve at least one underdrive gear ratio.

* * * * *